United States Patent
Wils

(10) Patent No.: US 11,210,176 B1
(45) Date of Patent: *Dec. 28, 2021

(54) STORAGE MANAGEMENT SYSTEM AND METHOD

(71) Applicant: EMC IP Holding Company, LLC, Hopkinton, MA (US)

(72) Inventor: Joris J. Wils, Acton, MA (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 443 days.

This patent is subject to a terminal disclaimer.

(21) Appl. No.: 15/799,065

(22) Filed: Oct. 31, 2017

(51) Int. Cl.
*G06F 16/22* (2019.01)
*G06F 11/14* (2006.01)
*G06F 16/23* (2019.01)
*G06F 16/901* (2019.01)

(52) U.S. Cl.
CPC ...... *G06F 11/1464* (2013.01); *G06F 16/2379* (2019.01); *G06F 16/9027* (2019.01); *G06F 2201/84* (2013.01)

(58) Field of Classification Search
CPC .. G06F 16/128; G06F 11/1446; G06F 16/185; G06F 16/9027
See application file for complete search history.

(56) References Cited

U.S. PATENT DOCUMENTS

| | | | | |
|---|---|---|---|---|
| 2012/0317079 | A1* | 12/2012 | Shoens | G06F 11/2094 707/639 |
| 2013/0124798 | A1* | 5/2013 | Aszmann | G06F 3/0689 711/114 |
| 2019/0065322 | A1* | 2/2019 | Chakankar | G06F 11/1451 |

* cited by examiner

*Primary Examiner* — Apu M Mofiz
*Assistant Examiner* — Cindy Nguyen
(74) *Attorney, Agent, or Firm* — Brian J. Colandreo; Mark H. Whittenberger; Holland & Knight LLP

(57) ABSTRACT

A method, computer program product, and computing system for processing a snapshot tree structure of a storage system, wherein the snapshot tree structure defines a plurality of filter elements including one or more snapshots. A snapshot matrix is generated based, at least in part, upon the snapshot tree structure, wherein the snapshot matrix defines the amount of data storage consumed by one or more eclipsed elements and the corresponding eclipsing elements.

21 Claims, 7 Drawing Sheets

STORAGE MANAGEMENT SYSTEM AND METHOD

TECHNICAL FIELD

This disclosure relates to storage management systems and methods and, more particularly, to storage management systems and methods for use within high-availability data storage systems.

BACKGROUND

In today's IT infrastructure, high availability is very important. And the storing and safeguarding of electronic content is of paramount importance in modern business. Accordingly, high-availability storage systems may be utilized to protect and provide availability to such electronic content, wherein various systems and methodologies (e.g., backup and data protection methodologies) may be utilized to enhance the manner in which such electronic content is protected for the user.

SUMMARY OF DISCLOSURE

In one implementation, a computer-implemented method is executed on a computing device and includes processing a snapshot tree structure of a storage system, wherein the snapshot tree structure defines a plurality of filter elements including one or more snapshots. A snapshot matrix is generated based, at least in part, upon the snapshot tree structure, wherein the snapshot matrix defines the amount of data storage consumed by one or more eclipsed elements and the corresponding eclipsing elements.

One or more of the following features may be included. An inquiry may be received concerning the quantity of data storage that may be recovered within the storage system if one or more target snapshots are deleted, wherein the one or more target snapshots are chosen from the one or more snapshots included within the plurality of filter elements. The snapshot matrix may be manipulated based, at least in part, upon the one or more target snapshots to identify a one or more quantities of recoverable data storage. Manipulating the snapshot matrix based, at least in part, upon the one or more target snapshots may include: deleting one or more columns associated with the one or more target snapshots from the snapshot matrix, thus defining one or more deleted columns; and moving at least a portion of the content of the one or more deleted columns to one or more adjacent columns. Manipulating the snapshot matrix based, at least in part, upon the one or more target snapshots may include: deleting one or more rows associated with the one or more target snapshots from the snapshot matrix, thus defining one or more deleted rows; and moving at least a portion of the content of the one or more deleted rows to one or more adjacent rows. The one or more quantities of recoverable data storage may be presented to a user. The plurality of filter elements may further include an active filter.

In another implementation, a computer program product resides on a computer readable medium that has a plurality of instructions stored on it. When executed by a processor, the instructions cause the processor to perform operations including processing a snapshot tree structure of a storage system, wherein the snapshot tree structure defines a plurality of filter elements including one or more snapshots. A snapshot matrix is generated based, at least in part, upon the snapshot tree structure, wherein the snapshot matrix defines the amount of data storage consumed by one or more eclipsed elements and the corresponding eclipsing elements.

One or more of the following features may be included. An inquiry may be received concerning the quantity of data storage that may be recovered within the storage system if one or more target snapshots are deleted, wherein the one or more target snapshots are chosen from the one or more snapshots included within the plurality of filter elements. The snapshot matrix may be manipulated based, at least in part, upon the one or more target snapshots to identify a one or more quantities of recoverable data storage. Manipulating the snapshot matrix based, at least in part, upon the one or more target snapshots may include: deleting one or more columns associated with the one or more target snapshots from the snapshot matrix, thus defining one or more deleted columns; and moving at least a portion of the content of the one or more deleted columns to one or more adjacent columns. Manipulating the snapshot matrix based, at least in part, upon the one or more target snapshots may include: deleting one or more rows associated with the one or more target snapshots from the snapshot matrix, thus defining one or more deleted rows; and moving at least a portion of the content of the one or more deleted rows to one or more adjacent rows. The one or more quantities of recoverable data storage may be presented to a user. The plurality of filter elements may further include an active filter.

In another implementation, a computing system includes at least one processor and at least one memory architecture coupled with the at least one processor, wherein the computing system is configured to perform operations including processing a snapshot tree structure of a storage system, wherein the snapshot tree structure defines a plurality of filter elements including one or more snapshots. A snapshot matrix is generated based, at least in part, upon the snapshot tree structure, wherein the snapshot matrix defines the amount of data storage consumed by one or more eclipsed elements and the corresponding eclipsing elements.

One or more of the following features may be included. An inquiry may be received concerning the quantity of data storage that may be recovered within the storage system if one or more target snapshots are deleted, wherein the one or more target snapshots are chosen from the one or more snapshots included within the plurality of filter elements. The snapshot matrix may be manipulated based, at least in part, upon the one or more target snapshots to identify a one or more quantities of recoverable data storage. Manipulating the snapshot matrix based, at least in part, upon the one or more target snapshots may include: deleting one or more columns associated with the one or more target snapshots from the snapshot matrix, thus defining one or more deleted columns; and moving at least a portion of the content of the one or more deleted columns to one or more adjacent columns. Manipulating the snapshot matrix based, at least in part, upon the one or more target snapshots may include: deleting one or more rows associated with the one or more target snapshots from the snapshot matrix, thus defining one or more deleted rows; and moving at least a portion of the content of the one or more deleted rows to one or more adjacent rows. The one or more quantities of recoverable data storage may be presented to a user. The plurality of filter elements may further include an active filter.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
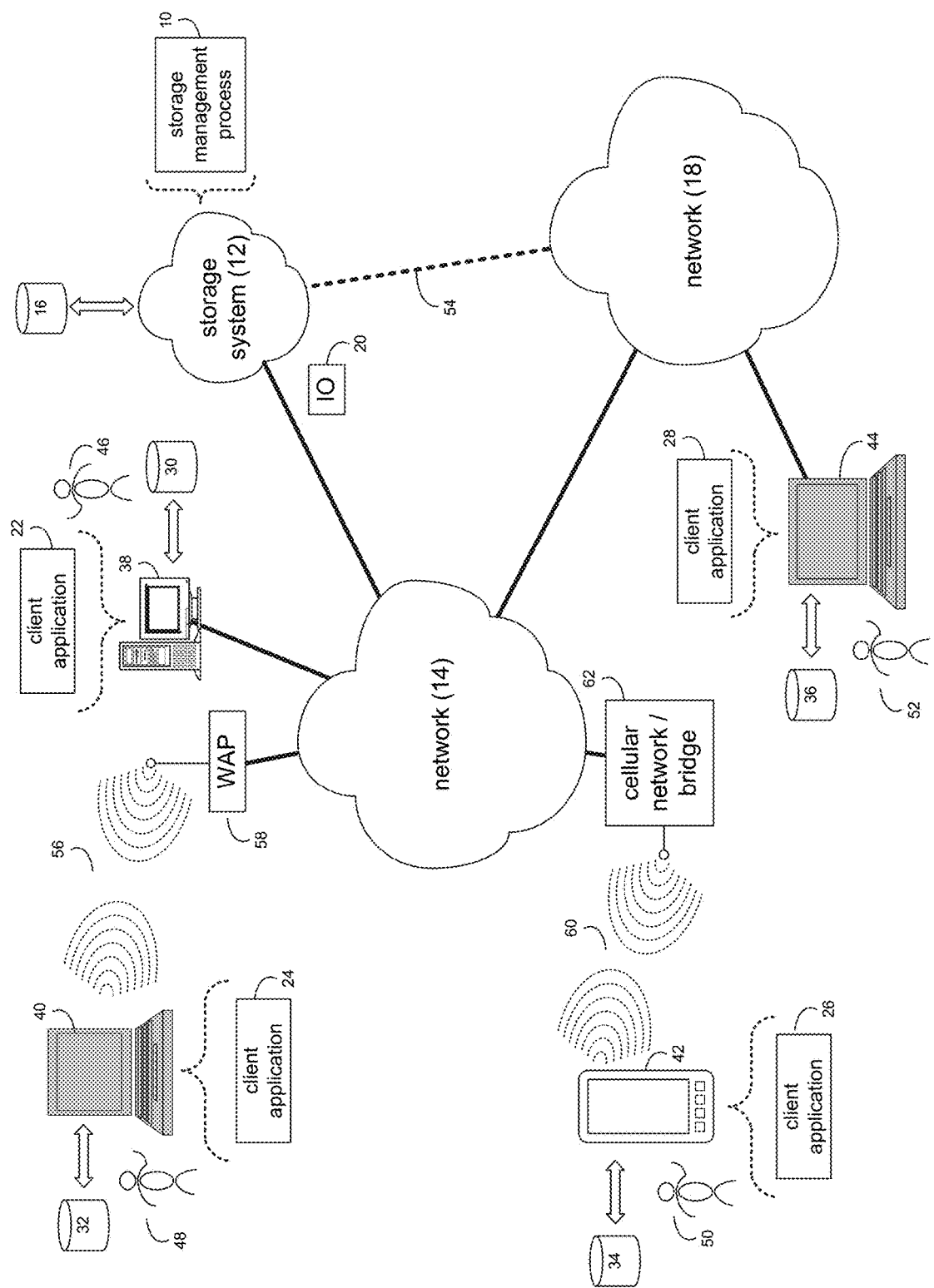
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to, high-availability storage systems such as: a Network Attached Storage (NAS) system, a Storage Area Network (SAN), a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
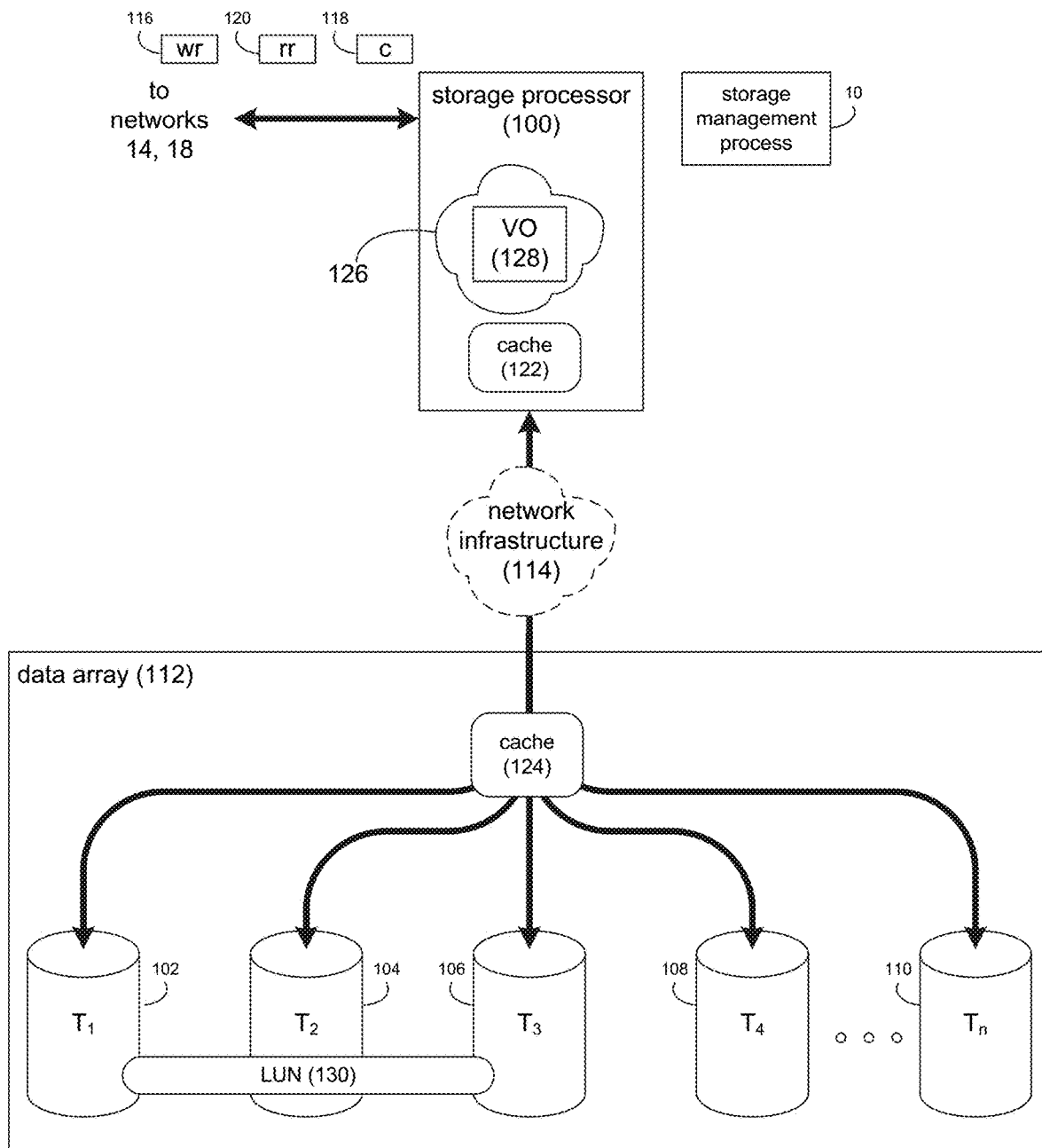
FIG. 2 is a diagrammatic view of an implementation of the storage system of FIG. 1.

Referring also to FIG. 2, there is shown one particular implementation of storage system 12. Storage system 12 may include storage processor 100 and a plurality of storage targets T1-n (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5 or RAID 6 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data. As is known in the art, coded data may allow for the regeneration of data lost/corrupted on one or more of storage targets 102, 104, 106, 108, 110.

Examples of storage targets 102, 104, 106, 108, 110 may include one or more electro-mechanical hard disk drives and/or one or more solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

The Storage Management Process:

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; an optical drive; a RAID device; a random access memory (RAM); a read-only memory (ROM); and all forms of flash memory storage devices. Additionally, some or all of the instruction sets and subroutines of storage management process 10 may be executed by one or more processors (not shown) and one or more memory architectures (not shown) included within data array 112.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100 and storage management process 10. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 and storage management process 10 may initially store content 118 within frontend cache memory system 122. Depending upon the manner in which frontend cache memory system 122 is configured, storage processor 100 and storage management process 10 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 and storage management process 10 may initially store content 118 within backend cache memory system 124 prior to being stored on e.g. one or more of storage targets 102, 104, 106, 108, 110.

Depending on the manner in which storage system 12 is configured, storage system 12 may be configured to execute virtual operating environment 126. An example of virtual operating environment 126 may include but is not limited to a hypervisor, which is an instantiation of an operating/file system that may allow for one or more virtualized objects (e.g., virtualized object 128) to operate within a single physical device. Examples of virtualized object 128 may include but are not limited to a virtual machine, a container, or some other form of virtualized object.

Accordingly, the combination of virtual operating environment 126 and virtualized object 128 may allow one or more users to access the resources of storage processor 100 (and one or more additional storage processors, not shown) and data array 112 (and one or more additional data arrays, not shown). Through the use or storage system 12 and/or virtual operating environment 126, one or more LUNs (e.g., LUN 130) may be defined.

As is known in the art, LUN is an acronym for Logical Unit Number, which is a unique identifier that may designate one or more physical or virtual storage devices that are configured to execute I/O commands on a host computer. Typically, a logical unit number (i.e., a LUN) is assigned when a host scans a SCSI device and discovers a logical unit, wherein the LUN may identify the specific logical unit to e.g., a SCSI initiator (not shown). Although (technically) the term LUN is only the identifying number of a logical unit, the IT industry commonly uses LUN as shorthand to refer to the logical unit itself.

While in this example, LUN 130 is a logical storage unit that is constructed from portions of storage targets 102, 104, 106, this is for illustrative purposes only and is not intended to be a limitation of this disclosure, as other configurations are possible and are considered to be within the scope of this disclosure. For example, LUN 130 may be a portion of a single storage target, an entire storage target, or portions of multiple storage targets. Accordingly, it is understood that LUN 130 may refer to an entire RAID set, a single storage target (or storage partition), or multiple storage targets (or storage partitions).

As is known in the art, snapshots may be utilized to provide restoration functionality for data sets stored within e.g., storage system 12. In computer systems, a snapshot is the state of a system (e.g., storage system 12) at a particular point in time. A full backup of a large data set (such as that stored on data array 112) may take considerable time to complete. This process may be more complicated on multi-tasking/multi-user systems, as write operation being performed on the data set during the backup operation may result in version skew and/or data corruption.

To avoid such problems, high-availability systems may perform a backup as a snapshot (i.e., a read-only copy of the data set frozen at a particular point in time) and may allow applications to continue writing to the data set. Most snapshot implementations are efficient and may create snapshots very quickly, as the time and I/O operations required to create the snapshot may not increase with the size of the data set. Additionally and in some systems, once an initial snapshot is taken of a data set, subsequent snapshots may only record changes to the data set and may use a system of pointers to reference the initial snapshot. As could be imagined, this method of pointer-based snapshots typically consumes less storage capacity than if the data set was repeatedly cloned.

Figure 3:
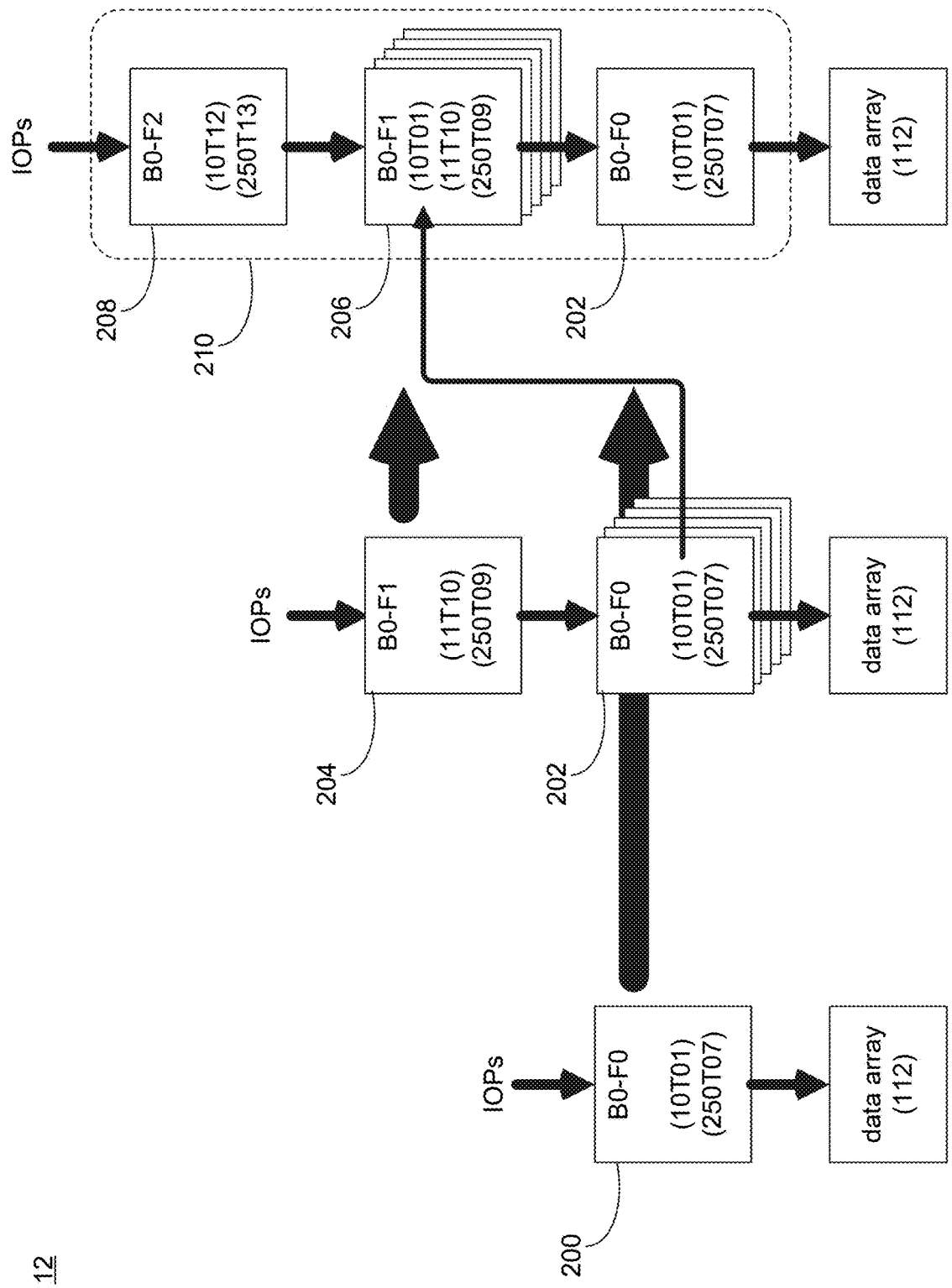
FIGS. 3A-3C are diagrammatic views of another implementation of the storage system of FIG. 1.

Referring to FIGS. 3A-3C, there is shown a graphical representation of a snapshot operation, wherein (and as will be explained below) the status of the snapshots are shown at three distinct instances in time (e.g., FIG. 3A being the earliest, FIG. 3B being the middle, and FIG. 3C being the latest). In this particular implementation, there is shown data array 112. As discussed above, data array 112 may include a plurality of storage targets (e.g., storage targets 102, 104, 106, 108, 110), wherein storage targets 102, 104, 106, 108, 110 may include one or more electro-mechanical hard disk drives and/or one or more solid-state/flash devices.

Referring specifically to FIG. 3A, assume for illustrative purposes (and as discussed above) that IOPs (Input/Output Operations) are received and processed by storage system 12, wherein filters (e.g., active filter 200) are utilized to map (or point to) where the data is located within data array 112. Assume for this example that IOPs write a first piece of data to data array 112 at location 10T01 (i.e., at offset (or LBA) 10 within storage target T0D and a second piece of data to data array 112 at location 250T07 (i.e., at offset (or LBA) 250 within storage target T07.

Referring specifically to FIG. 3B, assume that a user/administrator of storage system 12 utilizes storage management process 10 to provide a first restoration point for storage system 12, resulting in the generation of first snapshot 202, which is a copy of active filter 200 at the time that first snapshot 202 was generated.

As is known in the art, when first snapshot 202 is generated by storage management process 10, first snapshot 202 may actually include a plurality of discrete snapshots (as shown in FIG. 3B) that correspond to the storage targets within e.g., data array 112. For example and in this particular disclosure, first snapshot 202 may include five distinct snapshot that correspond to the five distinct storage targets (e.g., storage targets 102, 104, 106, 108, 110) included within data array 112.

Since first snapshot 202 will be "frozen in time" and will no longer be written to, first snapshot 202 will indicate the status of data array 112 at the time that first snapshot 202 was generated. Further, as data array 112 still needs to service IOPs, storage management process 10 may generate a new active filter (e.g., active filter 204) that will process subsequent IOPs.

Assume for this example that IOPs write a third piece of data to data array 112 at location 11T10 (i.e., at offset (or LBA) 11 within storage target T10) and a fourth piece of data to data array 112 at location 250T09 (i.e., at offset (or LBA) 250 within storage target T09). Since the fourth piece of data (250T09) and the second piece of data (250T07) are both at offset (or LBA) 250 within data array 112, the fourth piece of data (250T09) will eclipse (i.e., replace) the second piece of data (250T07). However, as first snapshot 202 is pointing to the second piece of data (250T07), the second piece of data (250T07) still needs to be maintained within data array 112 just in case first snapshot 202 is utilized by storage manage process 10 to restore data array 112.

Referring specifically to FIG. 3C, assume that the user/administrator of storage system 12 utilizes storage management process 10 to provide a second restoration point for storage system 12, resulting in the generation of second snapshot 206, which is a copy of active filter 204 at the time that second snapshot 206 was generated.

As is known in the art, when second snapshot 206 is generated by storage management process 10, second snapshot 206 may actually include a plurality of discrete snapshots (as shown in FIG. 3C) that correspond to the storage targets within e.g., data array 112. For example and in this particular disclosure, Second snapshot 206 may include five distinct snapshot that correspond to the five distinct storage targets (e.g., storage targets 102, 104, 106, 108, 110) included within data array 112. Since second snapshot 206 will be "frozen in time" and will no longer be written to, second snapshot 206 will indicate the status of data array 112 at the time that second snapshot 206 was generated. Further, as data array 112 still needs to service IOPs, storage management process 10 may generate a new active filter (e.g., active filter 208) that will process subsequent IOPs.

Assume for this example that IOPs write a fifth piece of data to data array 112 at location 10T12 (i.e., at offset (or LBA) 10 within storage target T11) and a six piece of data to data array 112 at location 250T13 (i.e., at offset (or LBA) 250 within storage target T13).

Since the fifth piece of data (10T12) and the first piece of data (10T01) are both at offset (or LBA) 10 within data array 112, the fifth piece of data (10T12) will eclipse (i.e., replace) the first piece of data (10T01). However, as first snapshot 202 is pointing to the first piece of data (10T01), the first piece of data (10T01) still needs to be maintained within data array 112 just in case first snapshot 202 is utilized by storage management process 10 to restore data array 112. Further, since the sixth of data (250T13) and the fourth piece of data (250T09) are both at offset (or LBA) 250 within data array 112, the sixth piece of data (250T13) will eclipse (i.e., replace) the fourth piece of data (250T09). However, as second snapshot 206 is pointing to the fourth piece of data (250T09), the fourth piece of data (250T09) still needs to be maintained within data array 112 just in case second snapshot 206 is utilized by storage manage process 10 to restore data array 112.

As is known in the art, newer snapshots may be configured to build upon older snapshots. For example, newer snapshot 206 may build upon older snapshot 202, in that newer snapshot 206 may include the (10T01) entry from older snapshot 202, as the (10T01) entry from older snapshot 202 would be needed by newer snapshot 06 to restore all or a portion of data array 112.

As discussed above, various pieces of data within data array 112 may need to be maintained within data array 112 even though the data is no longer current (i.e., has been eclipsed). For example and as discussed above:

the first piece of data (10T01) still needs to be maintained within data array 112 just in case first snapshot 202 is utilized by storage management process 10 to restore data array 112;

the second piece of data (250T07) still needs to be maintained within data array 112 just in case first snapshot 202 is utilized by storage manage process 10 to restore data array 112; and fourth piece of data (250T09) still needs to be maintained within data array 112 just in case second snapshot 206 is utilized by storage manage process 10 to restore data array 112.

Unfortunately, as the number of snapshots and/or the complexity of storage system 12 increases, the quantity of "eclipsed" data that must be maintained within data array 112 (even though the data is no longer needed because it has been "overwritten" with a new version of the data) may drastically increase. And further complicating the situation is that it is quite difficult to determine the quantity of storage space that may be freed up by deleting a snapshot (or multiple snapshots).

So continuing with the above-stated example, the manner in which storage system 12 (which includes in this example active filter 208, second snapshot 206 and first snapshot 202) operates will be discussed. As stated above, second snapshot 206 and first snapshot 202 are "frozen in time" and, therefore, are not modifiable. Accordingly and whenever an IOP is processed that concerns the writing of data, storage management process 10 may write the data via active filter 208, wherein active filter 208 is updated to include a pointer that locates the data with data array 112.

However, when a IOP is processed that concerns the reading of data, storage management process 10 may sequentially process the IOP until the data sought is located. For example, if the IOP received concerns the reading of data at offset (or LBA) 11, storage management process 10 may examine active filter 208 to determine whether active filter 208 includes a pointer that locates the data sought. Since active filter 208 does not include such a pointer, storage management process 10 may next examine second snapshot 206 to determine whether second snapshot 206 includes a pointer that locates the data sought. Since second snapshot does include such a pointer (e.g., 11T10) that locates the data sought at LBA11 within storage target T10, storage management process 10 may use pointer 11T10 to obtain the data sought and satisfy the TOP. In the event that second snapshot 206 did not contain a pointer to the data sought, storage management process 10 would then have examined first snapshot 202 for the appropriate pointer.

As will be discussed below, storage management process 10 may be configured to efficiently determine the quantity of storage that may be freed up by deleting a snapshot (or multiple snapshots).

In the past, such calculations were typically performed using a brute force analysis of a snapshot tree structure (e.g., snapshot tree structure 210) of a storage system (e.g., storage system 12). As discussed above, snapshot tree structure 210 may define a plurality of filter elements (e.g., one or more snapshots and/or active filters). In this particular example, snapshot tree structure 210 is shown to include three filter elements, namely two snapshots (e.g., first snapshot 202 and second snapshot 206) and active filter 208.

A typical example of the manner in which such a calculation may be made is as follows:

deleting first snapshot 202 may free up one data block within data array 112, namely the data block associated with 250T07 because that data block was eclipsed by the new data block at 250T09 of second snapshot 206. But the data block associated with 10T01 would is not freed up because second snapshot 206 is still pointing to 10T01 (i.e., did not eclipse it). Specifically, second snapshot 206 points to new data block 250T09, new data block 11T10 & old data block 10T01 from first snapshot 202.

deleting second snapshot 206 may free up one data block within data array 112, namely the data block associated with 250T09 because that data block was eclipsed by the new data block at 250T13 of active filter 208. But the data block associated with 11T10 would not free up because active filter 208 is still pointing to 11T10 (i.e., did not eclipse it). Specifically, active filter 208 points to new data block 10T12, new data block 250T13 & old data block 11T10 from second snapshot 206.

deleting first snapshot 202 and second snapshot 206 may free up three data blocks within data array 112, namely the data block associated with 250T07 (which was eclipsed by 250D9), the data block associated with 250T09 (which was eclipsed by 250T13) and the data block associated with 10T01 (which was eclipsed by 10T12). But the data block associated with 11T10 would not be freed up because active filter 208 is still pointing to 11T10 (i.e., did not eclipse it).

As could be imagined, the above-described process could get very complex and computationally intensive when the number of snapshots increases and the number of data elements is large.

Figure 4:
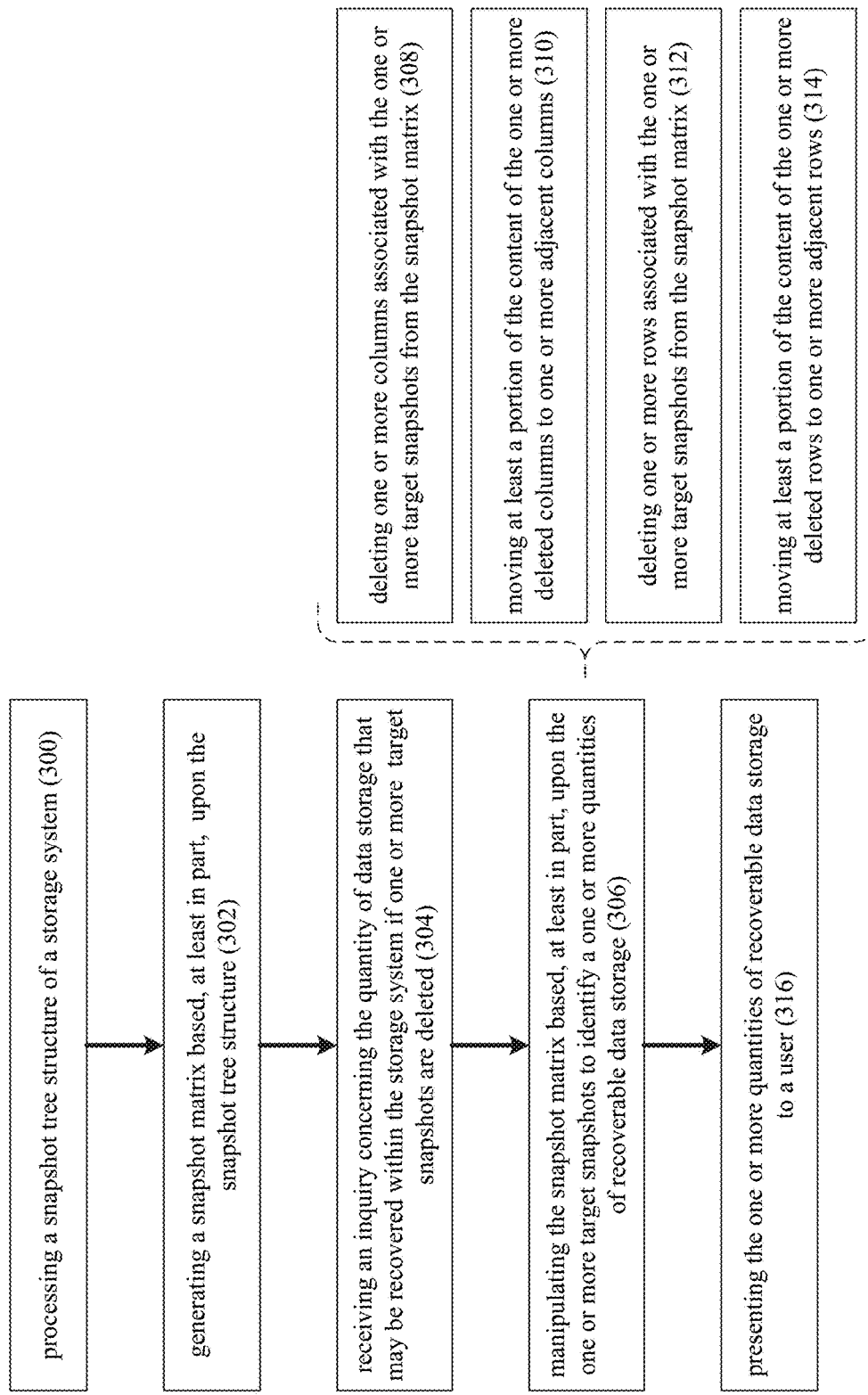
FIG. 4 is a flow chart of the storage management process of FIG. 1.

Referring also to FIG. 4, storage management process 10 may be configured to efficiently perform the above-described calculations (regardless of the quantity of snapshots and/or the complexity of storage system 12). For example, storage management process 10 may process 300 snapshot tree structure 210 of storage system 12, wherein snapshot tree structure 210 may define a plurality of filter elements (e.g., first snapshot 202, second snapshot 206 and active filter 208).

Figure 5:
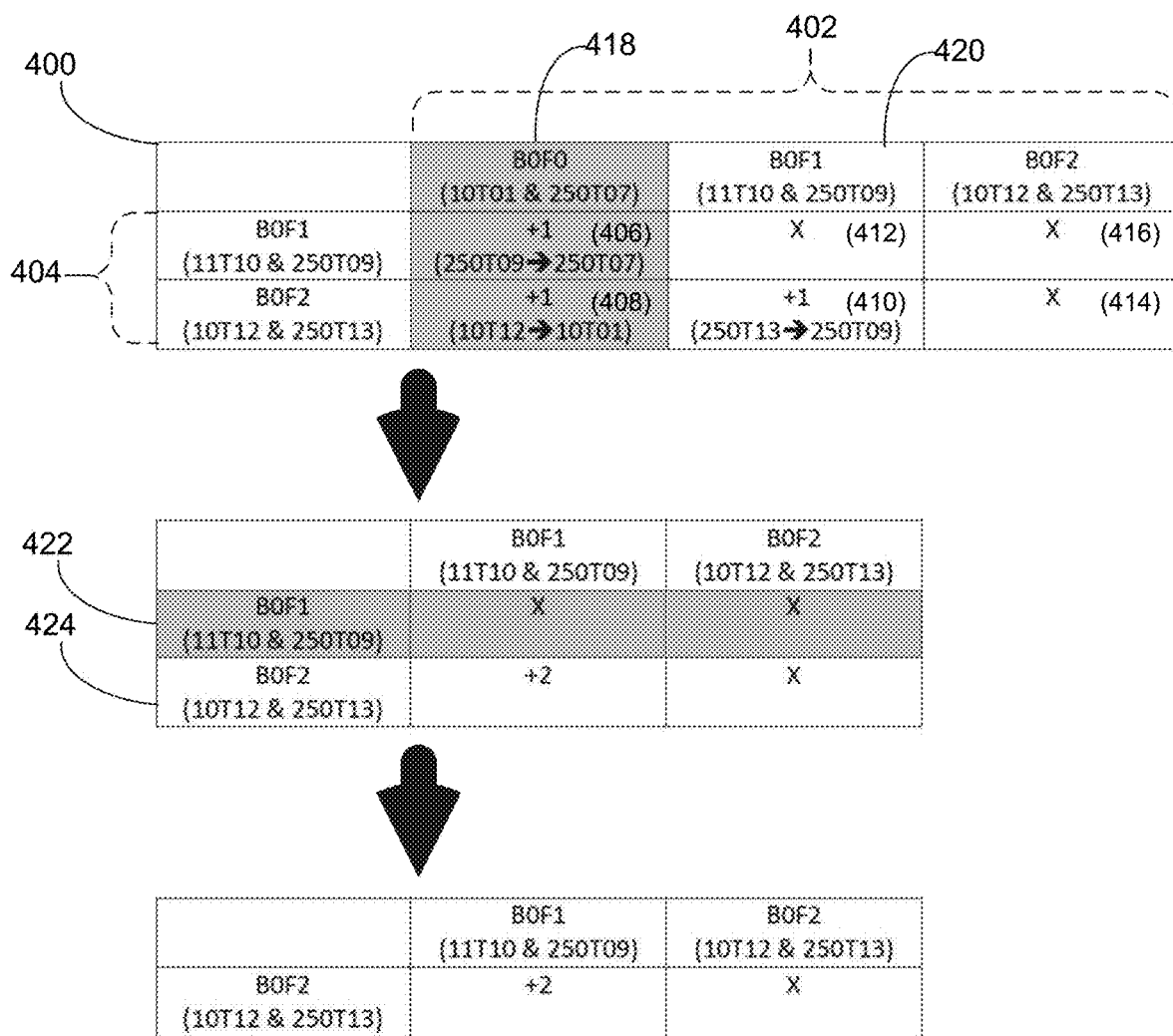
FIG. 5 is a first example of the manner in which a snapshot matrix may be manipulated by the storage management system of FIG. 1.

Referring also to FIG. 5, storage management process 10 may generate 302 a snapshot matrix (e.g., snapshot matrix 400) based, at least in part, upon snapshot tree structure 210, wherein snapshot matrix 400 may define the amount of data storage consumed (to be discussed below in greater detail) by one or more eclipsed elements (e.g., eclipsed elements 402) and the corresponding eclipsing elements (e.g., eclipsing elements 404). Specifically, an eclipsing element (chosen from eclipsing elements 404) may eclipse an eclipsed elements (chosen from eclipsed elements 402) when the eclipsed element is overwritten with newer data.

Generally and concerning the manner in which snapshot matrix 400 is populated, storage management process 10 may receive a request to write data to address "X" (e.g., an offset or LBA). In response, storage management process 10 may allocate target space "T" (e.g., a specific storage target) and may update the latest filter "F" (e.g., the active filter). Storage management process 10 may then read address "X" and find out that there is a data element defined in an older filter "OF" that has a data quantity of "OS". Storage management process 10 may then increment the appropriate entry in snapshot matrix 400 that defines latest filter "F" eclipsing older filter "OF" by data quantity "OS". Data quantity "OS" may be the actual storage consumption of the element (i.e. its compressed size) or the logical storage consumption of the element (e.g. its logical uncompressed size). In certain embodiments of snapshot matric 400, snapshot matrix 400 may actually include two matrices, one that defines compressed size and another that defines uncompressed size.

Specifically, the snapshot matrix (e.g., snapshot matrix 400) generated 302 by storage management process 10 is shown to include three eclipsed elements (e.g., eclipsed elements 402) and two eclipsing elements (e.g., eclipsing elements 404). Specifically and as discussed above, when IOPs are received that concern the writing of data, these IOPs may result in the writing of new data (i.e., data that was never written to data array 112 before) or the writing of a newer version of data that was previously written to data array 112. For example, when active filter 204 wrote the data associated with pointer 11T10, this was new data, as no other versions of this data were previously written to data array 112. However, when active filter 204 wrote the data associated with pointer 250T09, this was not new data and was an updated version of data that was previously written to data array 112 (namely the data associated with 250T07).

Snapshot matrix 400 is configured to illustrate a history of snapshot tree structure 210. For example, snapshot matrix 400 is shown to include six cells (e.g., cells 406, 408, 410, 412, 414, 416) that show the manner in which various pieces of data within data array 112 were updated during the generation of snapshot tree structure 210. For example, storage management process 10 may process 300 snapshot tree structure 210 of storage system 12 while snapshot tree structure 210 is being generated (or being updated). For example, as snapshots are added to snapshot tree structure 210, storage management process 10 may repeatedly process 300 snapshot tree structure 210 to generate 302 an updated version of snapshot matrix 400 that is indicative of the latest version of snapshot tree structure 210, Concerning the six cells (e.g., cells 406, 408, 410, 412, 414, 416) included within snapshot matrix 400: cell 406 identifies the amount of data that filter B0F1 eclipsed of filter B0F0. In this case it is the data at 250T09 eclipsed (updated) the data at 250T07, adding up to one unit of storage; cell 408 identifies that filter B0F2 eclipsed one storage unit of filter B0F0, because the data at 10T12 eclipsed (updated) the data at 10T01; and cell 410 identifies that filter B0F2 eclipsed one storage unit of Filter B0F1, because the data at 250T13 eclipsed (updated) the data at 250T09. Cells 412, 414, 416 are shown to each include Xs since an eclipse operation in those cells is impossible. For example, cell 412 illustrates that second snapshot 206 cannot eclipse itself, cell 414 illustrates that active filter 208 cannot eclipse itself, and cell 416 illustrates that second snapshot 206 cannot eclipse active filter 208, While the above discussion states that one unit of storage is added due to the various eclipsing operations described above, this is for illustrative purposes only and is not intended to be a limitation of this disclosure, as other configurations are possible and are considered to be within the scope of this disclosure. Specifically, the units of storage that are added due to an eclipsing operation may vary depending upon the size of the data write operation associated with that eclipsing operation. Accordingly and for illustrative purposes, if a single eclipsing operation writes ten units of storage (e.g., ten data blocks) to a storage target within data array 112, ten units of storage (e.g., ten data blocks) may be added. Accordingly, snapshot matrix 400 may be configured to accurately define the actual units of storage added due to a particular eclipsing operation. Further, the data storage added by the above-described eclipsing operations (as defined within snapshot matrix 400) may be expressed in units of actual (i.e., uncompressed) storage space or units of compressed storage space.

Storage management process 10 may receive 304 an inquiry concerning the quantity of data storage that may be recovered within storage system 12 if one or more target snapshots are deleted, wherein the one or more target snapshots are chosen from the one or more snapshots (e.g., snapshot 202 and/or snapshot 206) included within the plurality of filter elements defined within snapshot tree structure 210.

As will be discussed below in greater detail, storage management process 10 may manipulate 306 snapshot matrix 400 based, at least in part, upon the one or more target snapshots (e.g., first snapshot 202 and/or second snapshot 206) to identify one or more quantities of recoverable data storage, wherein storage management process 10 may then present 316 these one or more quantities of recoverable data storage to a user (e.g., a user/administrator of storage system 12), thus allowing the user/administrator to decide which of the target snapshots (e.g., first snapshot 202 and/or second snapshot 206) to delete.

For example, assume that a user/administrator of storage system 12 wishes to recover some data storage space within storage system 12 by deleting (in this example) one or more of first snapshot 202 and second snapshot 206. Accordingly, this user/administrator of storage system 12 may utilize storage management process 10 to estimate the amount of data storage space that may be recovered in the event that one or more of first snapshot 202 and second snapshot 206 are deleted.

While the following discussions and examples concern a snapshot tree structure (e.g., snapshot tree structure 210) that includes first snapshot 202, second snapshot 206 and active filter 208, the rudimentary nature of snapshot tree structure 210 is designed to allow for the easy understanding of the manner in which snapshot matrix 400 may be manipulated 306 in response to receiving 304 an inquiry concerning the quantity of data storage that may be recovered within storage system 12 if one or more target snapshots (e.g., first target snapshot 202 and/or second target snapshot 206) are deleted.

Deleting of the First Snapshot:

As discussed above, storage management process 10 may receive 304 an inquiry concerning the quantity of data storage that may be recovered within storage system 12 if one or more target snapshots are deleted. For the following example, assume that the user/administrator of storage system 12 inquires about the quantity of data storage that may be recovered if first snapshot 202 is deleted.

Accordingly, storage management process 10 may manipulate 306 snapshot matrix 400 based, at least in part, upon first snapshot 202 to identify the quantity of data storage that may be recovered if first snapshot 202 is deleted, wherein storage management process 10 may then present 316 this quantity of recoverable data storage to the user/administrator of storage system 12 so that the user/administrator may decide whether to delete first snapshot 202. Storage management process 10 may then merge 310 from filter B0F0 the data elements that were not eclipsed by filter B0F1. Specifically 10T01 is moved into B0F1, so that it remains part of snapshot 206 and 208. 250T07 is not moved and the associated data storage space is released, because snapshot 206 refers to 250T09. The described process can take large amounts of time, in particular if the number of data storage items is large.

When manipulating 306 snapshot matrix 400 based, at least in part, upon the one or more target snapshots (in this example, first snapshot 202), storage management process 10 may delete 308 one or more columns associated with first snapshot 202 from snapshot matrix 400, thus defining one or more deleted columns (e.g., deleted column 418). The columns to be deleted depend on the filters that can be deleted as part of the deletion of snapshot 202, in this case B0F0. Storage management process 10 may then move 310 at the one or more deleted columns (e.g., deleted column 418) to one or more adjacent columns (e.g., adjacent column 420).

Storage management process moves the contents of the deleted columns to the right, if allowed:
- the +1 in cell 406 cannot be move to the right into cell 412, because there is X, because a filter cannot eclipse itself.
- the +1 in cell 408 was moved to the right into cell 410 (where there is a +1 already and these two +1s are added to create a +2).

When manipulating 308 snapshot matrix 400 based, at least in part, upon the one or more target snapshots (in this example, first snapshot 202), storage management process 10 may delete 312 one or more rows associated with first snapshot 202 from snapshot matrix 400, thus defining one or more deleted rows (e.g., deleted row 422). The rows to be deleted depend on the filters that can be deleted as part of the deletion of snapshot 202, which would have been B0F0. Storage management process 10 may then move 314 at least a portion of the content of the one or more deleted rows (e.g., deleted row 422) to one or more adjacent rows (e.g., adjacent row 424).

So what happened above is as follows:
you would normally delete 312 the row associated with first snapshot 202, but there is no row for first snapshot 202 (as first snapshot 202 is the lowest filter in snapshot tree structure 210. However, the row (e.g., deleted row 422) associated with second snapshot 206 drops out because deleted row 422 has become a row of Xs.

So snapshot matrix 400 that initially had a total count of +3 now has a total count of +2, resulting in a savings of +1 (i.e., one data block will be freed by deleting first snapshot 202). Storage management process 10 may present 316 this quantity (one data block) to the user (e.g., a user/administrator of storage system 12), thus allowing the user/administrator to decide whether to delete first snapshot 202.

Deleting of the Second Snapshot:
As discussed above, storage management process 10 may receive 304 an inquiry concerning the quantity of data storage that may be recovered within storage system 12 if one or more target snapshots are deleted. For the following example, assume that the user/administrator of storage system 12 inquires about the quantity of data storage that may be recovered if second snapshot 206 is deleted. Storage management process 10 may then merge 310 from filter B0F1 the data elements that were not eclipsed by filter B0F2. Specifically 11T10 is moved into B0F2, so that it remains part of snapshot 208. 250T09 is not moved and the associated data storage space is released, because snapshot 208 refers to 250T13. The described process can take large amounts of time, in particular if the number of data storage items is large.

Accordingly, storage management process 10 may manipulate 306 snapshot matrix 400 based, at least in part, upon second snapshot 206 to identify the quantity of data storage that may be recovered if second snapshot 206 is deleted, wherein storage management process 10 may then present 316 this quantity of recoverable data storage to the user/administrator of storage system 12 so that the user/administrator may decide whether to delete second snapshot 206.

Figure 6:
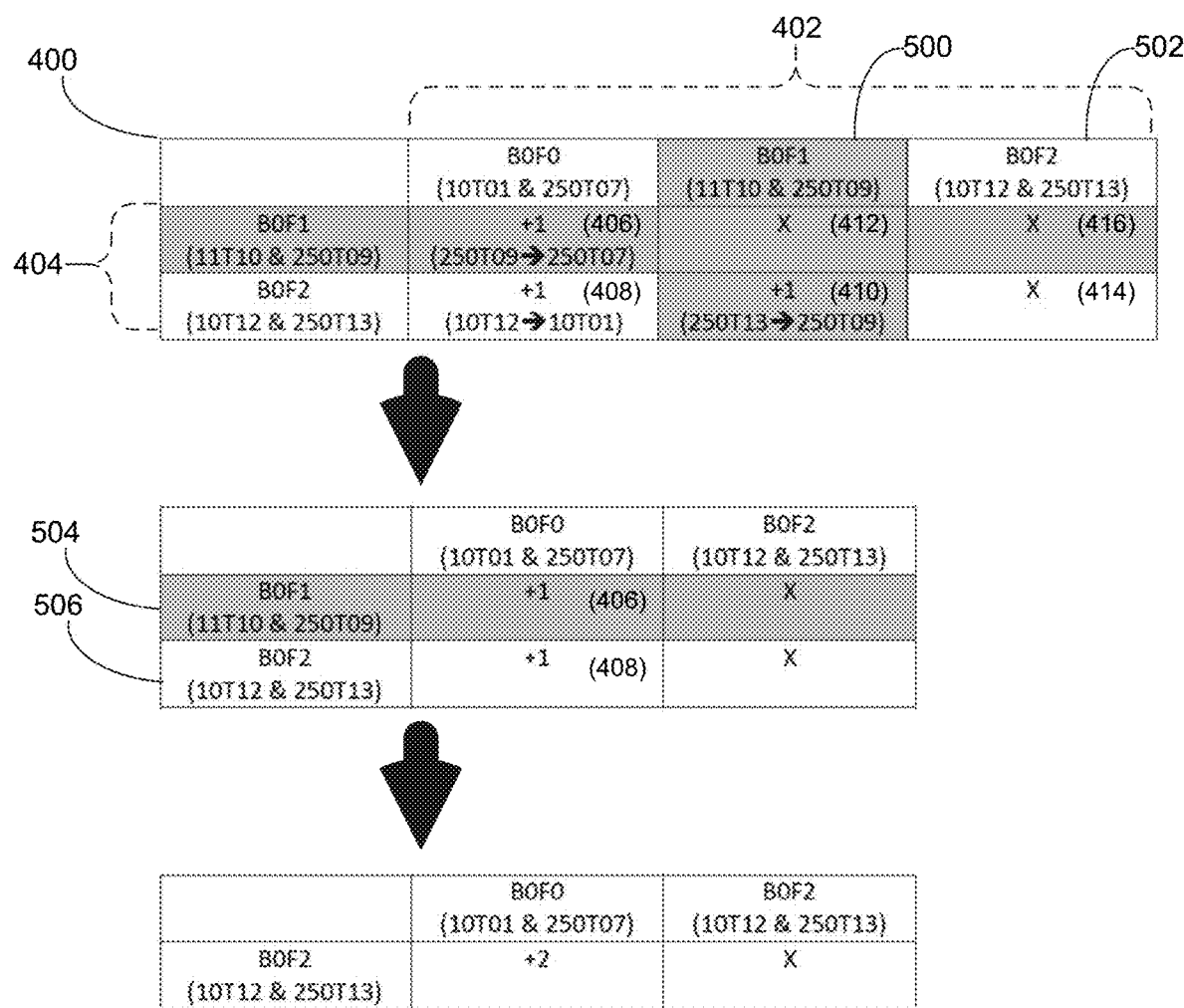
FIG. 6 is a second example of the manner in which a snapshot matrix may be manipulated by the storage management system of FIG. 1.

Referring also to FIG. 6, when manipulating 306 snapshot matrix 400 based, at least in part, upon the one or more target snapshots (in this example, second snapshot 206), storage management process 10 may delete 308 one or more columns associated with second snapshot 206 from snapshot matrix 400, thus defining one or more deleted columns (e.g., deleted column 500). Storage management process 10 may then move 310 at least a portion of the content of the one or more deleted columns (e.g., deleted column 500) to one or more adjacent columns (e.g., adjacent column 502). In this case column B0F1 is selected, because it distinguishes snapshot 206 from snapshot 202.

So what happened above is as follows:
- the X in cell 412 was moved to the right into cell 416 where there is an X (so there is no change); and
- the +1 in cell 410 was moved to the right into cell 414 where there is an X (and that data cell is not freed because it cannot eclipse itself.

When manipulating 308 snapshot matrix 400 based, at least in part, upon the one or more target snapshots (in this example, second snapshot 206), storage management process 10 may delete 312 one or more rows associated with second snapshot 206 from snapshot matrix 400, thus defining one or more deleted rows (e.g., deleted row 504). Storage management process 10 may then move 314 at least a portion of the content of the one or more deleted rows (e.g., deleted row 504) to one or more adjacent rows (e.g., adjacent row 506). In this case row B0F2 is selected, because it distinguishes snapshot 206 from snapshot 202.

So what happened above is as follows:
the numbers in deleted row 504 are dropped into (and added to) adjacent row 506. So the +1 in cell 406 is added to the +1 in cell 408, thus creating a +2

So snapshot matrix 400 that initially had a total count of +3 now has a total count of +2, resulting in a savings of +1 (i.e., one data block will be freed by deleting second snapshot 206). Storage management process 10 may present 316 this quantity (one data block) to the user (e.g., a user/administrator of storage system 12), thus allowing the user/administrator decide whether to delete second snapshot 206.

Deleting of the First & Second Snapshot:
As discussed above, storage management process 10 may receive 304 an inquiry concerning the quantity of data storage that may be recovered within storage system 12 if one or more target snapshots are deleted. For the following example, assume that the user/administrator of storage system 12 inquires about the quantity of data storage that may be recovered if first snapshot 202 and second snapshot 206 are both deleted. Storage management process 10 may then merge 310 from filters B0F0 and B0F1 the data elements that were not eclipsed by filter B0F2. Specifically 11T10 is moved into B0F2, so that it remains part of snapshot 208. 10T01, 250T07 and 250T09 are not moved and the associated data storage space is released, because snapshot 208 refers to 10T12 and 250T13 respectively. The described process can take large amounts of time, in particular if the number of data storage items is large.

Accordingly, storage management process 10 may manipulate 306 snapshot matrix 400 based, at least in part, upon first snapshot 202 and second snapshot 206 to identify the quantity of data storage that may be recovered if first snapshot 202 and second snapshot 206 are both deleted, wherein storage management process 10 may then present 316 this quantity of recoverable data storage to the user/administrator of storage system 12 so that the user/administrator may decide whether to delete first snapshot 202 and second snapshot 206.

Figure 7:
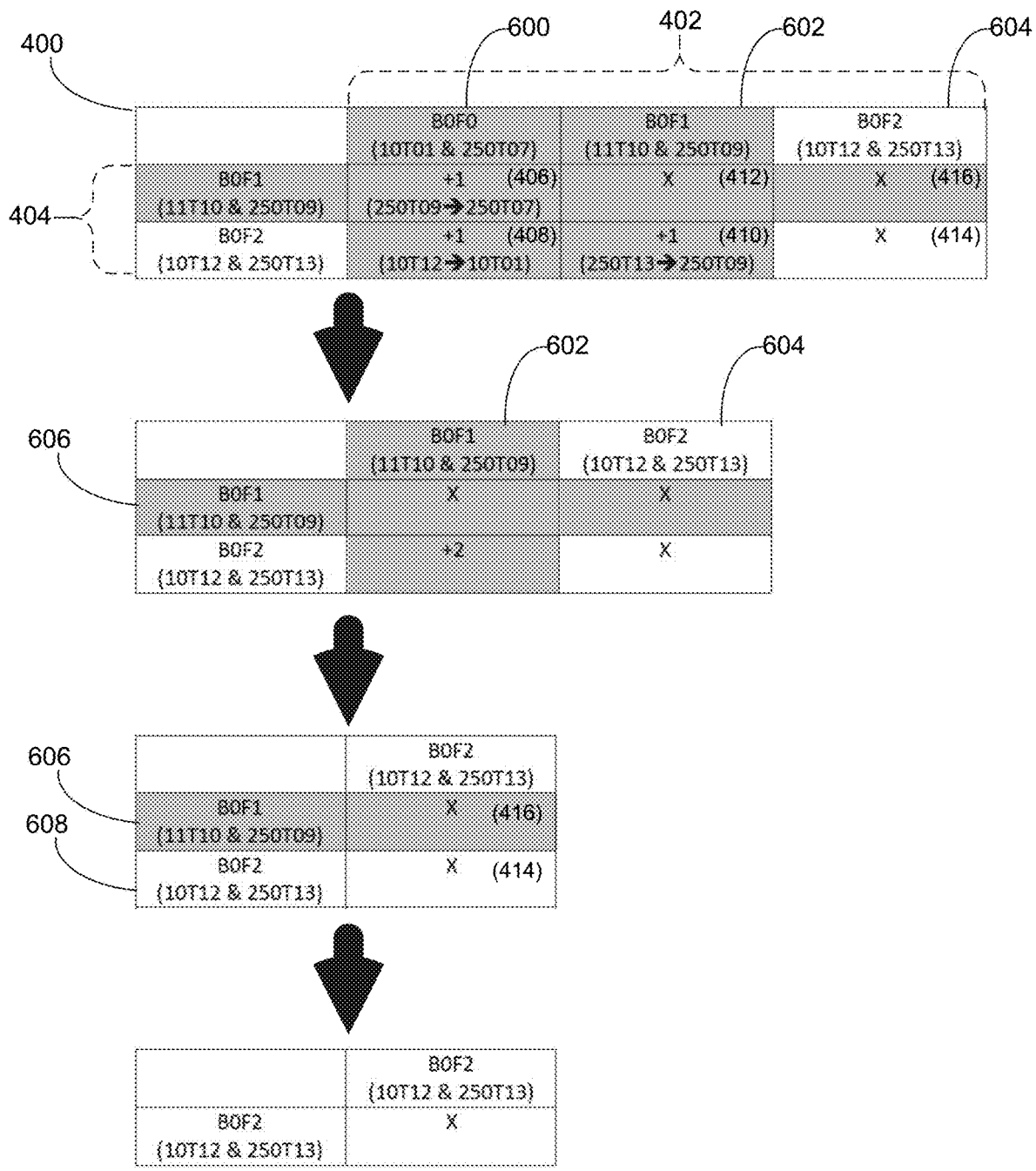
FIG. 7 is a third example of the manner in which a snapshot matrix may be manipulated by the storage management system of FIG. 1.

Referring also to FIG. 7, when manipulating 306 snapshot matrix 400 based, at least in part, upon the one or more target snapshots (in this example, first snapshot 202 and second snapshot 206), storage management process 10 may delete 308 one or more columns associated with first snapshot 202 and second snapshot 206 from snapshot matrix 400, thus defining one or more deleted columns (e.g., deleted columns 600, 602 of filters B0F0 and B0F1). Storage management process 10 may then move 310 at least a portion of the content of the one or more deleted columns (e.g., deleted column 600, 602) to one or more adjacent columns (e.g., adjacent column 604).

So what happened above is as follows:
the +1 in cell 406 was moved to the right into cell 412 where there is an X (and that data cell is freed because it cannot eclipse itself);
the +1 in cell 408 was moved to the right into cell 410 (where there is a +1 already and these two +1s are added to create a +2);
the X in cell 412 was moved to the right into cell 416 where there is an X (so there is no change); and
the +2 in cell 410 was moved to the right into cell 414 where there is an X (and those two data cells are freed because they cannot eclipse itself).

When manipulating 308 snapshot matrix 400 based, at least in part, upon the one or more target snapshots (in this example, first snapshot 202 and second snapshot 206), storage management process 10 may delete 312 one or more rows associated with first snapshot 202 and second snapshot 206 from snapshot matrix 400, thus defining one or more deleted rows (e.g., deleted row 606 of filter B0F1). Storage management process 10 may then move 314 at least a portion of the content of the one or more deleted rows (e.g., deleted row 606) to one or more adjacent rows (e.g., adjacent row 608).

So what happened above is as follows:
the numbers in deleted row 606 are dropped into (and added to) adjacent row 608. So the X in cell 416 is moved into cell 414 (so there is no change).

So snapshot matrix 400 that initially had a total count of +3 now has a total count of X (i.e., zero), resulting in a savings of +3 (i.e., three data blocks will be freed by deleting second snapshot 206). Storage management process 10 may present 316 this quantity (three data blocks) to the user (e.g., a user/administrator of storage system 12), thus allowing the user/administrator to decide whether to delete first snapshot 202 and second snapshot 206.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    writing at least a first piece, a second piece, a third piece, and a fourth piece of data to one or more offset locations data array, wherein the second piece of data and the fourth piece of data are both written to a same offset location within two different storage targets;
    eclipsing the second piece of data with the fourth piece of data to create an eclipsed element with at least one corresponding eclipsing element, wherein eclipsing the second piece of data with the fourth piece of data includes replacing the second piece of data with the fourth piece of data at the same offset location, wherein the fourth piece of data comprises the eclipsing element and the second piece of data comprises the eclipsed element;
    processing a snapshot tree structure of a storage system, wherein the snapshot tree structure defines a plurality of filter elements including one or more snapshots;
    generating a snapshot matrix based, at least in part, upon the snapshot tree structure, wherein the snapshot matrix defines the amount of data storage consumed by the eclipsed element and the corresponding eclipsing element; and
    generating an updated snapshot matrix, based on, at least in part, one or more new snapshots being added to the snapshot tree, wherein the updated snapshot matrix indicates a latest version of the snapshot tree structure.

2. The computer-implemented method of claim 1 further comprising:
    receiving an inquiry concerning the quantity of data storage that may be recovered within the storage system if one or more target snapshots are deleted, wherein the one or more target snapshots are chosen from the one or more snapshots included within the plurality of filter elements.

3. The computer-implemented method of claim 2 further comprising:
    manipulating the snapshot matrix based, at least in part, upon the one or more target snapshots to identify a one or more quantities of recoverable data storage.

4. The computer-implemented method of claim 3 wherein manipulating the snapshot matrix based, at least in part, upon the one or more target snapshots includes:
    deleting one or more columns associated with the one or more target snapshots from the snapshot matrix, thus defining one or more deleted columns; and
    moving at least a portion of the content of the one or more deleted columns to one or more adjacent columns.

5. The computer-implemented method of claim 3 wherein manipulating the snapshot matrix based, at least in part, upon the one or more target snapshots includes:
    deleting one or more rows associated with the one or more target snapshots from the snapshot matrix, thus defining one or more deleted rows; and
    moving at least a portion of the content of the one or more deleted rows to one or more adjacent rows.

6. The computer-implemented method of claim 3 further comprising:

presenting the one or more quantities of recoverable data storage to a user.

7. The computer-implemented method of claim 1 wherein the plurality of filter elements further includes an active filter.

8. A computer program product residing on a computer readable medium having a plurality of instructions stored thereon which, when executed by a processor, cause the processor to perform operations comprising:
   writing at least a first piece, a second piece, a third piece, and a fourth piece of data to one or more offset locations data array, wherein the second piece of data and the fourth piece of data are both written to a same offset location within two different storage targets;
   eclipsing the second piece of data with the fourth piece of data to create an eclipsed element with at least one corresponding eclipsing element, wherein eclipsing the second piece of data with the fourth piece of data includes replacing the second piece of data with the fourth piece of data at the same offset location, wherein the fourth piece of data comprises the eclipsing element and the second piece of data comprises the eclipsed element;
   processing a snapshot tree structure of a storage system, wherein the snapshot tree structure defines a plurality of filter elements including one or more snapshots;
   generating a snapshot matrix based, at least in part, upon the snapshot tree structure, wherein the snapshot matrix defines the amount of data storage consumed by the eclipsed element and the corresponding eclipsing element; and
   generating an updated snapshot matrix, based on, at least in part, one or more new snapshots being added to the snapshot tree, wherein the updated snapshot matrix indicates a latest version of the snapshot tree structure.

9. The computer program product of claim 8 further comprising:
   receiving an inquiry concerning the quantity of data storage that may be recovered within the storage system if one or more target snapshots are deleted, wherein the one or more target snapshots are chosen from the one or more snapshots included within the plurality of filter elements.

10. The computer program product of claim 9 further comprising:
    manipulating the snapshot matrix based, at least in part, upon the one or more target snapshots to identify a one or more quantities of recoverable data storage.

11. The computer program product of claim 10 wherein manipulating the snapshot matrix based, at least in part, upon the one or more target snapshots includes:
    deleting one or more columns associated with the one or more target snapshots from the snapshot matrix, thus defining one or more deleted columns; and
    moving at least a portion of the content of the one or more deleted columns to one or more adjacent columns.

12. The computer program product of claim 10 wherein manipulating the snapshot matrix based, at least in part, upon the one or more target snapshots includes:
    deleting one or more rows associated with the one or more target snapshots from the snapshot matrix, thus defining one or more deleted rows; and
    moving at least a portion of the content of the one or more deleted rows to one or more adjacent rows.

13. The computer program product of claim 10 further comprising:
    presenting the one or more quantities of recoverable data storage to a user.

14. The computer program product of claim 8 wherein the plurality of filter elements further includes an active filter.

15. A computing system including a processor and memory configured to perform operations comprising:
    writing at least a first piece, a second piece, a third piece, and a fourth piece of data to one or more offset locations data array, wherein the second piece of data and the fourth piece of data are both written to a same offset location within two different storage targets;
    eclipsing the second piece of data with the fourth piece of data to create an eclipsed element with at least one corresponding eclipsing element, wherein eclipsing the second piece of data with the fourth piece of data includes replacing the second piece of data with the fourth piece of data at the same offset location, wherein the fourth piece of data comprises the eclipsing element and the second piece of data comprises the eclipsed element;
    processing a snapshot tree structure of a storage system, wherein the snapshot tree structure defines a plurality of filter elements including one or more snapshots;
    generating a snapshot matrix based, at least in part, upon the snapshot tree structure, wherein the snapshot matrix defines the amount of data storage consumed by the eclipsed element and the corresponding eclipsing element; and
    generating an updated snapshot matrix, based on, at least in part, one or more new snapshots being added to the snapshot tree, wherein the updated snapshot matrix indicates a latest version of the snapshot tree structure.

16. The computing system of claim 15 further comprising:
    receiving an inquiry concerning the quantity of data storage that may be recovered within the storage system if one or more target snapshots are deleted, wherein the one or more target snapshots are chosen from the one or more snapshots included within the plurality of filter elements.

17. The computing system of claim 16 further comprising:
    manipulating the snapshot matrix based, at least in part, upon the one or more target snapshots to identify a one or more quantities of recoverable data storage.

18. The computing system of claim 17 wherein manipulating the snapshot matrix based, at least in part, upon the one or more target snapshots includes:
    deleting one or more columns associated with the one or more target snapshots from the snapshot matrix, thus defining one or more deleted columns; and
    moving at least a portion of the content of the one or more deleted columns to one or more adjacent columns.

19. The computing system of claim 17 wherein manipulating the snapshot matrix based, at least in part, upon the one or more target snapshots includes:
    deleting one or more rows associated with the one or more target snapshots from the snapshot matrix, thus defining one or more deleted rows; and
    moving at least a portion of the content of the one or more deleted rows to one or more adjacent rows.

20. The computing system of claim 17 further comprising:
    presenting the one or more quantities of recoverable data storage to a user.

21. The computing system of claim 15 wherein the plurality of filter elements further includes an active filter.

* * * * *